June 7, 1960 R. J. BROADWELL ET AL 2,939,724
DAMPED AIR VALVE
Filed April 3, 1957 4 Sheets-Sheet 2
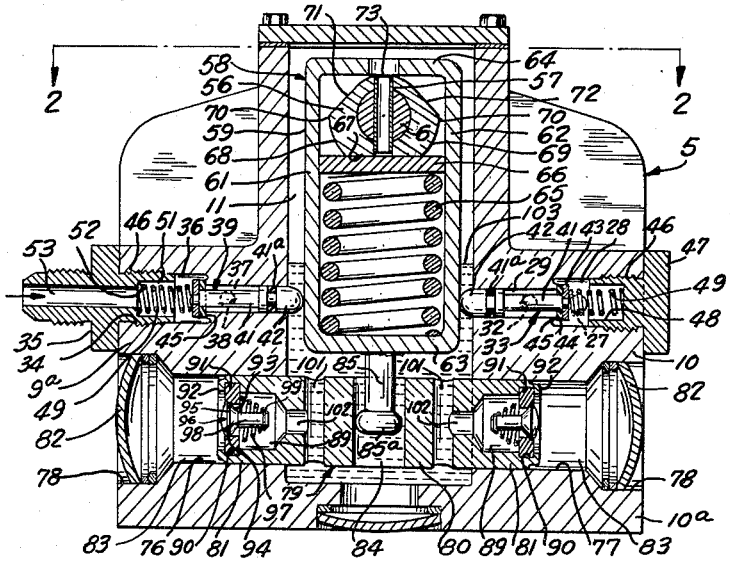
FIG. 3
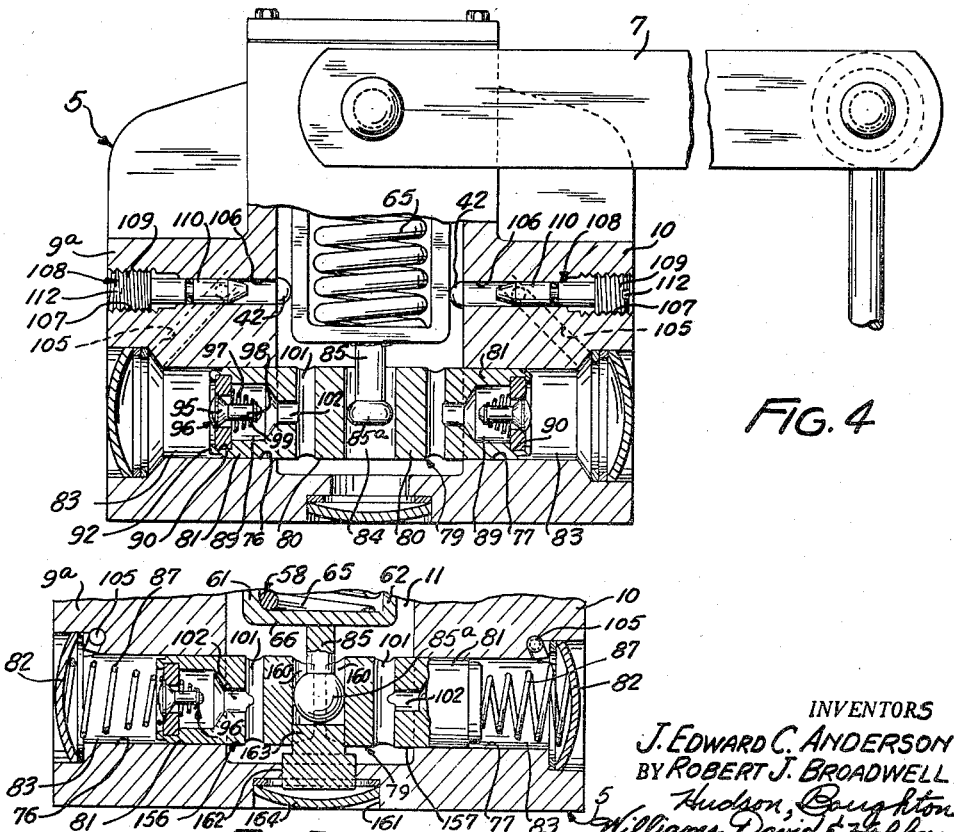
FIG. 4
FIG. 7
INVENTORS
J. EDWARD C. ANDERSON
BY ROBERT J. BROADWELL
Hudson, Boughton,
Williams, David & Hoffman
ATTORNEYS June 7, 1960 R. J. BROADWELL, ET AL 2,939,724
DAMPED AIR VALVE
Filed April 3, 1957 4 Sheets-Sheet 3
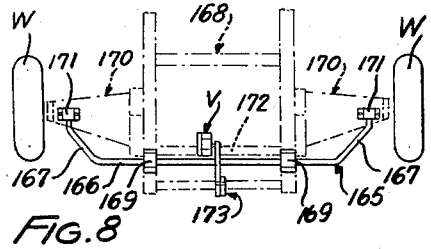
FIG.8
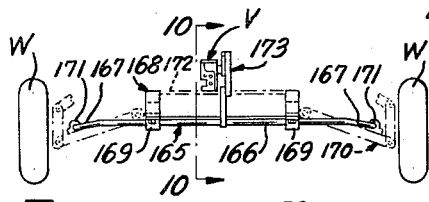
FIG.9
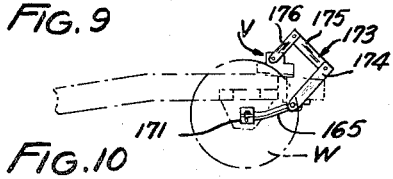
FIG.10
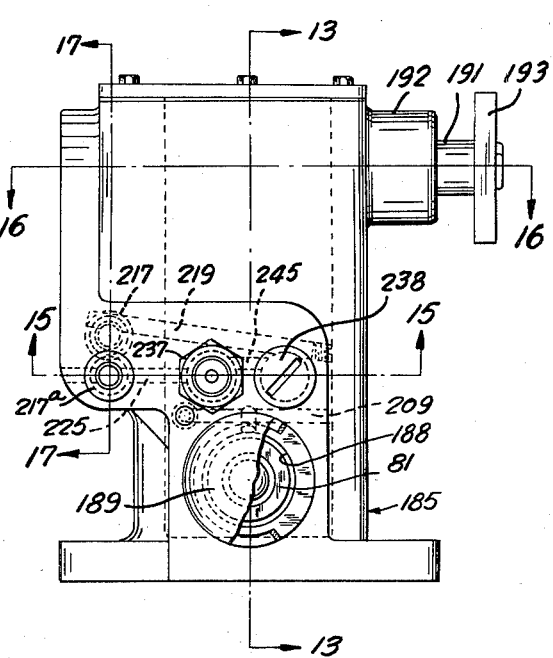
FIG.12
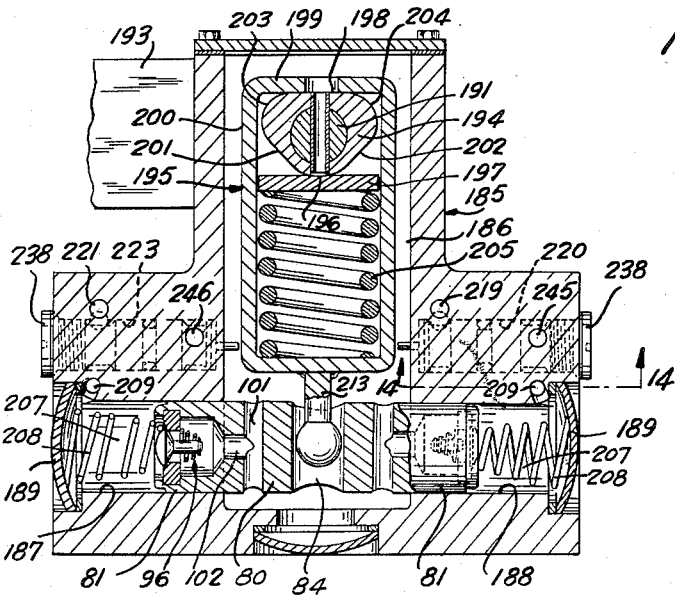
FIG.13
FIG.14
INVENTORS
J. EDWARD C. ANDERSON
BY ROBERT J. BROADWELL
Hudson, Boughton,
Williams, David & Hoffmann
ATTORNEYS

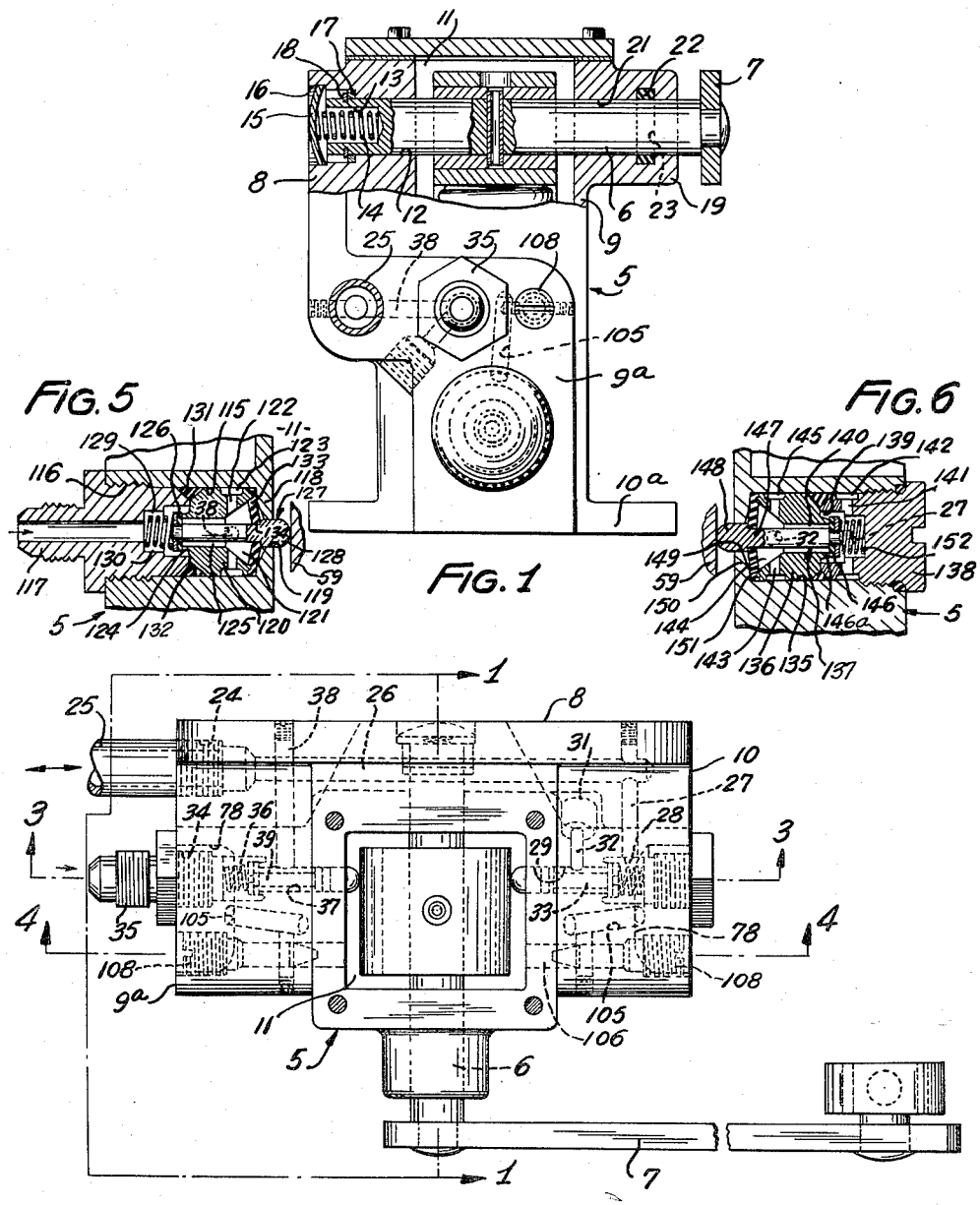

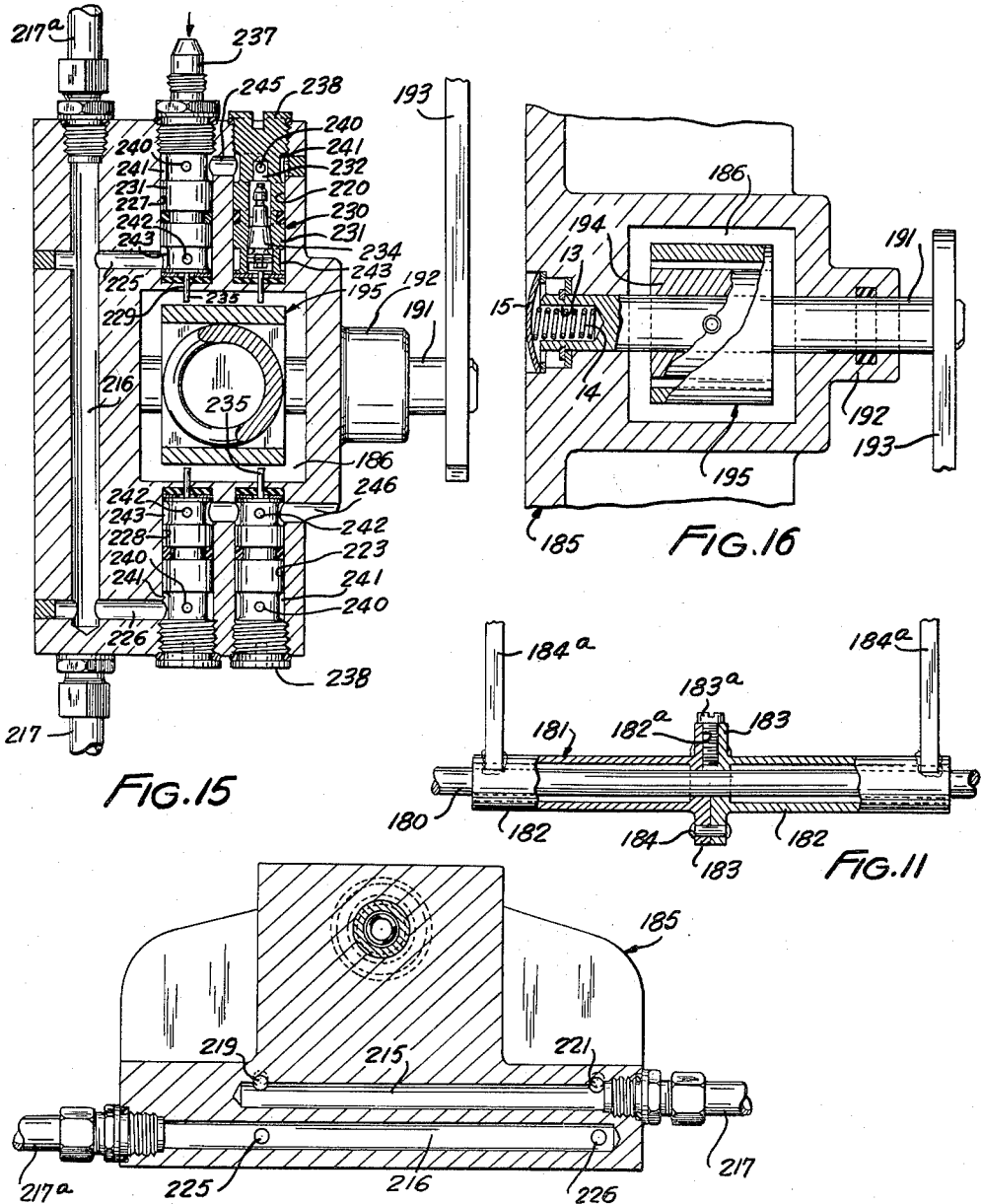

United States Patent Office 2,939,724
Patented June 7, 1960

2,939,724

DAMPED AIR VALVE

Robert J. Broadwell and J. Edward C. Anderson, Cleveland, Ohio, assignors to The Gabriel Company, Cleveland, Ohio, a corporation of Ohio Filed Apr. 3, 1957, Ser. No. 650,488

3 Claims. (Cl. 280—124)

This invention relates to a novel damped valve device for controlling the movement of one or more members relative to another member, wherein one and/or all of said members may be movable, and is particularly applicable for use with one or more fluid pressure devices which effect the relative movement of two movable members, wherein the relative movement of said members actuates the damped valve device to positively control the functioning of said fluid pressure device and/or devices.

Primary utility for the instant damped valve device is realized upon its utilization in a pneumatic suspension system for automotive vehicles or the like whereby the body of the vehicle defining one movable member or mass is resiliently supported above the axles thereof by an air spring, said axles defining a second movable member or mass, and wherein said damped valve device is operatively connected between said vehicle members and further, is actuated by a relative movement therebetween to cause an adjustment to said air spring and maintain said vehicle members in a predetermined spaced relationship.

In the following detailed disclosure of several forms of the present invention said damped valve device is shown and described for use in conjunction with the above type of vehicle pneumatic suspension system; however, it is to be understood that the instant device may be applicable to other systems wherein control of the relative movement between a plurality of members may be desired.

Therefore, a primary object of the present invention is the provision of an improved damped valve device for use with a fluid pressure device for controlling the relative movement of two movable members.

Another object is the provision of an improved damped valve device as characterized in the preceding object and wherein said device includes a shaft operatively connected to one movable member and which carries a pendant assembly normally positioned in an inactive position and which is movable by the oscillation of the shaft to selectively control the functioning of said fluid pressure device and thereby control the relative movement of said members in proportion to the movement of said one member connected to the shaft.

Still another object of the present invention is the provision of an improved damped valve device as characterized in the last two preceding objects and wherein the pendant assembly is resiliently coupled to the shaft and movable thereby and operable at a point remote from said coupling to selectively control the functioning of said fluid pressure device and thereby control the relative movement of said members, and wherein the damped valve device is additionally provided with damping and delay means operative to delay the movement of the pendant assembly.

Another object of the present invention is the provision of an improved damped valve device for use in connection with a resilient air spring in a pneumatic vehicle suspension system for supporting the body of the vehicle above its riding axles in a predetermined spaced relationship, and wherein the damped valve device includes a shaft connected to either one of the vehicle members being oscillated thereby in response to a relative movement between said vehicle members to actuate said device and change the resiliency of said air spring in proportion to the movement of either and/or both of said vehicle members.

The invention may be briefly summarized as consisting in certain constructions and combinations and arrangements of parts, and further objects and advantages will be apparent from the following description of several preferred forms of the invention, reference being made to the accompanying drawings which form a part of this specification and wherein, Fig. 1 is a side elevational view shown partly in section taken substantially on line 1—1 of Fig. 2, showing one form of damped valve device embodying the present invention;

Fig. 2 is a plan view taken on line 2—2 of Fig. 3 of the form of valve device shown in Fig. 1, but with the housing cap removed to show internal structure;

Fig. 3 is an elevational sectional view taken substantially on line 3—3 of Fig. 2;

Fig. 4 is a front elevational view shown partly in section and taken substantially on line 4—4 of Fig. 2;

Fig. 5 is a fragmentary vertical sectional view of a modified form of valve mechanism for controlling the inlet flow of pressure fluid into the housing;

Fig. 6 is a fragmentary vertical sectional view of a modified form of valve mechanism for controlling the exhaust of pressure fluid from the valve housing;

Fig. 7 is a fragmentary vertical sectional view of the lower portion of the housing of the present invention, but illustrating another form of piston assembly for the damping and delay mechanism;

Fig. 8 is a diagrammatic plan view of one end of a vehicle and shows the device of the present invention attached to the frame of said vehicle and operably connected to a torsion bar, which in turn is interconnected to the wheel supporting structure and the body frame of said vehicle;

Fig. 9 is a diagrammatic front elevational view of the vehicle of Fig. 8 and shows the relative vertical disposition of the damped valve device and its link attachment to the torsion bar;

Fig. 10 is a side elevational view of the vehicle of Fig. 8 taken substantially on line 10—10 of Fig. 9 and shows the several links comprising the link attachment connection between the torsion bar and the damp valve device of the present invention;

Fig. 11 is a fragmentary view shown partly in section of another form of torsion bar mechanism;

Fig. 12 is a side elevational view of still another form of damped valve device embodying the present invention;

Fig. 13 is a vertical sectional view taken substantially on line 13—13 of Fig. 12;

Fig. 14 is fragmentary sectional view taken substantially on line 14—14 of Fig. 13 and shows the metering valve for controlling the flow of fluid medium between the pressure chamber of the cylinders and the reservoir;

Fig. 15 is a horizontal sectional view taken substantially on line 15—15 of Fig. 12;

Fig. 16 is a sectional view taken substantially on line 16—16 of Fig. 12, looking in the direction of the arrows, and shows the actuating shaft journalled in the housing and mounting the pendant assembly; and Fig. 17 is a vertical sectional view taken substantially on line 17—17 of Fig. 12.

In the following detailed description of several forms of the present invention the pneumatic suspension system (not shown) shall be considered as of the type referred to above utilizing "air springs" of known construction, and which supports a vehicle body above its axles, being adjustable by the damped valve device of the present invention to maintain said body above the axles in a predetermined spaced relationship.

Assuming that the vehicle body is supported above the axles in their normal "safe-riding" spaced relationship, then loading of the body would compress the air springs whereby the said body is lowered toward the axles. To prevent this the relative movement between said vehicle members functions to actuate the instant device and introduce a pressurized fluid, preferably air, to said air springs to return said body to its normal riding position. In like manner, if the mass of the body is lessened, the air springs would tend to cause said body to rise farther above the axles and this is prevented by actuation of the damped valve device through the relative movement of said vehicle members in the opposite direction, whereby the air springs are connected to atmosphere and deflated in accordance with the diminishing load to maintain the vehicle body at its normal riding height relative to the axles.

Additionally, assuming that the vehicle is traveling over an irregular roadway whereby the vehicle members are rapidly forced slightly toward or away from each other, the damping and delay mechanism included in the present invention is operative to prevent rapid inflation and/or deflation of the air springs which would eventually cause said air springs to be completely inoperative.

Referring to Figs. 1 to 4, one form of the damped valve device is shown to control merely one air spring solely for purposes of illustrating and describing the present invention. However, it is contemplated that any desired number of said air springs may be utilized without departing from the inventive concepts contained herein. The air springs may be of any suitable construction. For example, air springs in the form of expansible and contractible bellows as disclosed in United States Patent No. 2,670,201 may be utilized. Said device includes a housing 5 in which an oscillatable shaft 6 is journalled. The housing 5 is adapted to be attached to either vehicle member, the frame or riding axles, while the shaft mounts one end of a lever 7, the opposite end of which is suitably attached to the remaining vehicle member. The housing is provided with upstanding side walls 8 and 9 and end walls 9a and 10 integrally attached to a base 10a, which define a cavity or fluid containing reservoir 11 therebetween. The shaft extends across the upper end of the reservoir 11 and has its one end journalled in a bore 12 provided in the side wall 8. A dead end hole 13 formed axially in said latter end of the shaft houses a coil spring 14, one end of which is in pressure engagement with the closed end of said hole. The opposite end of said spring is in pressure engagement with a closure member 15 mounted in a counterbore 16 formed axially to and connecting with the bore 12. A suitable bushing 17 disposed in the counterbore and surrounding the shaft is adapted to be engaged by a ring 18 mounted on said shaft whereby the latter is prevented from being moved longitudinally through the housing under the influence of the spring 14. The upstanding wall 9 of the housing 5 is provided with a boss 19 which has a bore 21 formed therein and into which the opposite end of the shaft 6 is journalled. A suitable ring-type seal 22 disposed in an annular groove 23 formed in the boss is adapted to engage the surface of said shaft whereby the transgression of fluid or other extraneous material therebetween is prevented.

As previously mentioned, the control valve device of the present invention is interposed in the vehicle fluid suspension system to control the inflation and/or deflation of the air spring in response to a predetermined relative movement between the vehicle members supported thereby. To accomplish this, the housing 5 is provided with a threaded port 24, Fig. 2, which receives one end of a suitable conduit 25, the other end of which (not shown) is connected to the air spring. A channel 26, one end of which communicates with the port 24, extends longitudinally through the housing and its opposite end is in communication with one end of a similarly formed channel 27 extending transversely through said housing. The opposite end of said latter channel connects with a valve chamber 28, which, in turn, communicates with an elongated bore 29 opening into the reservoir 11. An aperture 31 opening to atmosphere is connected to the medial portion of the bore 29 by means of a channel 32. A valve 33, later to be described, normally acts to seal the valve chamber 28 from the bore 29, and is actuated by a predetermined movement of the shaft 6 to connect the air spring to atmosphere, through the above described interconnected system of passageways, to deflate the latter.

The housing 5 is also provided with a threaded port 34 which receives a sleeve fitting 35 to which, in turn, is connected a suitable source of pressure fluid (not shown), preferably air. A valve chamber 36 is formed in the housing, being in prolongation of the port 34, and communicates with an elongated bore 37 opening into the reservoir 11 on the side thereof opposite to the bore 29. A channel 38 has its one end in communication with the medial portion of the bore 37 and extends transversely through the housing 5 and its opposite end connects with the longitudinally extending channel 26. A valve 39, similar to valve 33, normally acts to seal the valve chamber 36 from the elongated bore 37 and is actuated by a predetermined movement of the shaft in the opposite direction to connect the air spring to the source of pressure fluid to inflate the latter.

The valves 33 and 39, per se, as above stated, are similar in form and, therefore, a detailed description of only valve 33 will be given. However, identical reference characters will be utilized to denote equivalent components for both valves. With reference to Fig. 3, valve 33 comprises an elongated stem 41 adapted to be slidably disposed in bore 29, being spaced radially inwardly thereof with its one end protruding into the reservoir 11 and provided with a rounded head 42. A suitable O-ring 41a mounted on the head 42 acts to seal the bore 29 from the reservoir 11 to prevent transgression of fluid medium therebetween. The opposite end of said stem extends into the valve chamber 28 and mounts a valve disk 43. A suitable flexible gasket 44 carried by said disk is adapted to seat upon an annular raised valve seat 45 surrounding the adjoining end of the bore 29 and normally acts to seal the valve chamber 28 from said bore. The valve chamber 28 is partially threaded at 46 and receives therein a closure plug 47, thereby sealing the same from atmosphere. A dead-end hole 48 is formed axially through the plug 47 opening into the valve chamber 28 and receives one end of a coil spring 49. The opposite end of said coil spring engages the adjacent face of the valve disk 43 whereby the flexible gasket 44 is normally biased into pressure engagement with its associated valve seat 45.

The valve 39 has its stem 41 disposed in similar fashion in bore 37 wherein its rounded head 42 protrudes into the reservoir 11 on the side thereof opposite to the head of valve 33. The aforesaid sleeve fitting 35 is provided on its inner end with a counterbore 51 which defines an annular shoulder 52 at its junction with a port 53 formed centrally through said fitting. The coil spring 49 of the valve 39 extends into said counterbore and has its one end seated upon the annular shoulder 52. The opposite end of said spring engages the adjoining face of the valve disk 43 whereby the flexible gasket 44 is biased into pressure engagement with its valve seat 45 to normally seal the valve chamber 36 from the bore 37.

With the above construction, it is now seen that upon depressing the stem 41 of the valve 39 its valve disk 43 and attached gasket 44 are carried off the valve seat 45 and the source of pressure fluid (not shown) is connected to the air spring to inflate the latter through bore 37, interconnected channels 38 and 26 and conduit 25. It is also realized that upon connecting the source of pressure fluid to the air spring, said source is also presented to the valve chamber 28 by means of interconnected channels 26 and 27 to exert an additional biasing force upon the valve disk 43 of valve 33 and assist in seating its flexible gasket 44 upon the valve seat 45.

In like manner, it is also seen that upon depressing the stem 41 of the valve 33, its valve disk 43 and attached gasket 44 are raised off their associated valve seat 45 to connect the air spring to atmosphere through interconnected channels 26 and 27, valve chamber 28, bore 29, channel 32 and aperture 31 to deflate said air spring. And, bore 37 and channel 38, being connected to channel 26 are also connected to atmosphere whereby any pressure fluid that may become entrapped therein is exhausted to prevent the actuation of valve 39.

As mentioned previously, the valves 33 and 39 are actuated in response to a predetermined relative movement between the vehicle members to deflate and/or inflate the air spring, respectively. For this purpose, a cam 56 is mounted on the shaft 6 and secured thereto by means of hollow pin 57. A pendant assembly 58 is resiliently coupled to the shaft and comprises a rectangular, ring-like cage 59 having flat side walls 61 and 62 integrally connected on one end to a base member 63 and on the opposite end to a top plate 64. The cage 59 is placed over the cam 56 in a manner such that the side walls 61 and 62 extend downwardly into the reservoir 11 and are adapted to engage the plunger 41 of each of the valves 39 and 33. A coil spring 65 carried in said cage and interposed between the base member 63 and a movable pressure plate 66 also carried therein normally forces the latter into engagement with a flat portion 67 on said cam. As shown in Fig. 3, the cam 56 is also provided with similarly formed radially curved surfaces 68 and 69, one end of each of which connects to opposite sides of said flat portion. Said curved surfaces extend outwardly from the latter and the opposite ends thereof connect with oppositely inclined flat segments 71 and 72 defining at their respective juncture, an apex 70. The opposite ends of said segments are connected to a radially curved segment 73.

With the above described resilient coupling and assuming that the shaft 6 is operably connected to one of the vehicle members and oscillatably movable in response to a relative movement between said members, then as said shaft is rotated, for instance, in a clockwise direction, as viewed in Fig. 3, the cam 56 will also be rotated clockwise whereby the curved surace 69 of said cam rides over the pressure plate 66 and forces the same downward compressing the spring 65, whereby the force of the latter is increased. This movement increases the coupling between the shaft and the cage 59 sufficiently to cause the latter to be swung with said shaft and to depress the plunger 41 of the valve 39, which, in turn, is effective to connect the source of pressure fluid to the above described interconnected system of fluid passageways and thence to the air spring to inflate the latter.

Conversely, when the shaft 6 is rotated counterclockwise, the curved surface 68 of the cam 56 rides over the pressure plate 66 and forces the same downward to increase the force of the spring 65 and therefore increase the coupling between the shaft and said cage sufficiently to cause the latter to be swung with the shaft and to depress the plunger 41 of the valve 33. With the actuation of said valve the air spring is connected to atmosphere and deflated through the above described associated system of fluid passageways.

In accordance with the present invention, it is intended that the relative movement between the vehicle members must be sustained over a prolonged period of time in order to cause actuation of either valve 33 or 39 to effect the adjustment of the air spring. And, conversely, it is also intended that the more rapid movements between said vehicle members, such as are caused by operating the vehicle over an irregular roadway, are to be ineffective to cause said air spring adjustment.

To accomplish this, a delay and damping mechanism carried in the housing is operatively associated with the pendant assembly and functions to delay and/or dampen the swinging of the latter. In the instant form said mechanism includes a pair of cylinders 76 and 77, Fig. 3, provided in the housing on opposite sides of the reservoir 11 and having one end in communication with the latter. Each of said cylinders extends horizontally outwardly of the reservoir in opposed and aligned relationship relative to each other and connects with an enlarged counterbore 78 provided in the outside face of the housing walls. A piston assembly 79 is operatively connected to the pendant assembly 58 and includes an elongated substantially cylindrical piston body 80 slidably disposed in the cylinders 76 and 77, extending through the reservoir 11 and provided on each of its ends with a valved head 81. A circular, shallow cup-shaped closure member 82 is placed in each counterbore 78 and is effective to seal off the outer end of each cylinder to define therein a fluid pressure chamber 83 between it and each valved head 81 of the piston body 80. A bore 84, formed in the medial portion of said body 80 and extending transversely therethrough is adapted to receive one end of a piston actuating finger or arm 85, having an enlarged head 85a thereon adapted to interfit and engage the annular wall of said bore. The opposite end of said finger or arm is rigidly attached to the center of the base 63 of the cage 59. It is realized, therefore, that a swinging movement of the pendant assembly will cause the enlarged head 85a provided on the end of said finger or arm to engage the wall of the bore 84 and reciprocally slide the piston body 80 through either the cylinders 76 or 77 and the reservoir 11. The direction of movement of said piston body is determined by the direction of movement of the pendant assembly, which, in turn, is responsive to the direction of the relative movement between the vehicle members. For instance, in the present form, assuming that the housing 5 is attached to the vehicle body and the shaft 6 is operatively connected to the riding axles, then as the relative movement between said vehicle members is such as to cause the pendant assembly 58 to be swung clockwise as viewed in Fig. 3, the piston body 80 will be moved to the left or into cylinder 76. And in like manner, if said relative movement causes the pendant assembly to be swung counterclockwise, said piston body will be moved to the right or into cylinder 77.

The valved head 81 on each end of the piston body 80 is similar in construction and consists of a valve chamber 89 provided centrally in the end of the piston body and extending longitudinally therethrough and toward the medial portion of the latter. An annular recess 90 is formed in the wall of said valve chamber into which is seated a valve plate 91. The end extremity of said body may be spun or otherwise similarly deformed to provide an annular rim 92 extending radially inwardly over the outside face of said valve plate to retain the latter in its operative position. The valve plate 91 is also provided centrally with a port 93 which communicates with the associated valve chamber 89 and pressure chamber 83, and additionally, an annular valve seat 94 surrounds one end of said port and seats the head 95 of a replenishing valve 96 which is operable to selectively disconnect said valve chamber from said pressure chamber. A spring 97, surrounding a stem 98 of said valve and which has its opposite ends in pressure engagement with the valve plate 91 and a spring retaining washer 99 mounted on the end of said stem, is effective to resiliently seat said valve upon its respective valve seat 94.

The medial portion of the piston body 80 is also provided with a pair of transversely extending ports 101, each of which is on opposite sides of the bore 84 and spaced longitudinally therefrom along the body. A longitudinally extending orifice 102 formed centrally in said body connects each of the ports 101 with the valve chamber 89 of the valved head 81 adjacent thereto.

A supply of fluid medium, preferably oil, denoted in Fig. 3 by the reference character 103, is placed in the reservoir 11 and may flow through each port 101 and orifice 102, thence into the valve chamber 89 of each valved head 81 to actuate the replenishing valve member 96, whereby the pressure chamber 83 in each cylinder is maintained substantially full of said fluid medium.

The movement of the piston body 80 is resisted by the fluid medium in the pressure chambers 83 of said cylinders, and in accordance with the present invention, the damping and delay mechanism includes a system of fluid passageways that are effective in response to a relative movement between the vehicle members that is sustained over a predetermined functioning period to meter the fluid medium from one or the other of said pressure chambers, depending upon the direction of said relative movement, and thereby gradually reduce this resistance, whereby the pendant assembly 58 may be swung sufficiently to actuate one or the other of the valve members 33 or 39 and effect the adjustment of the air spring.

To accomplish this said fluid passageways include a port 105, Fig. 4, provided in each end wall 9a and 10 of the housing 5 and which has one end in communication with the pressure chamber 83 of each of cylinders 76 and 77, respectively. Each of said ports inclines upwardly and inwardly within its respective housing end wall wherein the opposite end thereof communicates with a metering port 106. Each of said metering ports is shown to extend completely through its respective housing end wall and has one end opening into the reservoir 11, and its opposite end internally threaded at 107. A metering valve 108, having an externally threaded head 109 and an integrally attached and elongated cylindrical pin 110, is adapted to be threadably mounted in each of said metering ports 106 such that its pin extends through the port sufficiently to overlie the point of entry of the port 105 with said latter port. The head 109 of the metering valve 108 is provided with a slot 112 to permit manual longitudinal selective positioning of said pin 110 relative to said point of entry whereby the quantity of fluid medium to pass therethrough may be regulated.

With the above construction and assuming that the housing 5 of the instant device is mounted on the body of the vehicle and the lever 7 is connected through suitable linkage (not shown) to the riding axles, then a relative movement between the vehicle members caused for instance, by increasing the load carried by the vehicle body whereby the latter is lowered toward the riding axles, so as to tend to swing the pendant assembly 58 clockwise, as viewed in Figs. 3 and 4, said swinging movement is resisted by the fluid medium in the pressure chamber 83 of cylinder 76 acting against the operatively connected piston assembly 79. And, assuming that the relative movement between the vehicle members is sustained over a predetermined period, the force exerted upon said piston assembly is sufficient to gradually overcome said fluid resistance, whereby said piston assembly moves to the left or into the cylinder 76 and the fluid in said pressure chamber is forced through the connected port 105, past the metering valve 108 and into the port 106 and returned thereby to the reservoir 11. Also, as the piston assembly 79 is moving into cylinder 76, reducing the volume of its pressure chamber 83, it is moving outwardly or to the left in cylinder 77, thereby increasing the volume of its pressure chamber, whereby the pressure exerted by the fluid medium in said latter chamber upon its associated replenishing valve 96 is decreased. The fluid medium in the reservoir 11 is then effective through the connected port 101, orifice 102 and valve chamber 89 to actuate the replenishing valve in the valve head 81 in said latter cylinder to permit the fluid medium to flow into said pressure chamber and maintain the latter substantially full of said fluid medium. When the pendant assembly has swung clockwise sufficiently to actuate valve member 39, the source of pressure fluid in circuit therewith is connected to the air spring whereby the latter is inflated, which, in turn, causes the vehicle body to be raised upwardly above the axles, resulting in a relative movement between said vehicle members in the opposite direction. Said latter movement tends to swing the pendant assembly 58 counterclockwise and is resisted by the fluid medium in the pressure chamber 83 of cylinder 77 acting upon the operatively connected piston assembly 79. The sustained force exerted upon the pendant assembly by said latter relative movement between the vehicle members in conjunction with the above described resilient coupling is effective to overcome this fluid medium resistance and said piston assembly is thereby moved to the right or into cylinder 77. The fluid medium in the pressure chamber of said latter cylinder is thereby metered into the reservoir 11, and conversely, the pressure chamber of cylinder 76 is replenished with fluid medium in the manner as above described. The pendant assembly and piston assembly are thereby returned to their normal non-operative central position within the housing as depicted in Fig. 3, and the disk valve 43 of the valve member 39 seats upon its valve seat 45, disconnecting the source of pressure fluid from the air spring and the latter returns said vehicle members to their normal "safe-riding" spaced relationship. It is also realized that an initial sustained relative movement between the vehicle members in such direction as to tend to swing the pendant assembly counterclockwise will also be resisted by the damping and delay mechanism acting in the opposite direction, but in a manner similar to that described above, and after a predetermined delay period said resistance will be overcome to permit the pendant assembly to be swung sufficiently counterclockwise to actuate valve member 33 and cause said air spring to be deflated. The relative movement between the vehicle members resulting from the deflation of said air spring will then be in the opposite direction and will result in returning the pendant assembly and piston assembly to their normal central position within the housing, in a manner similar to that described above.

It is also seen that the resilient coupling between the cam 56 and the cage 59 permits the pendant assembly 58 to be moved vertically relative to the shaft 6. This provides a novel and important operational feature, as will now be explained. When the relative movement between the vehicle members causes the shaft 6 to be rotated such that one of the curved surfaces 68 or 69 of the cam 56 is carried over the pressure plate 66, a predetermined degree of coupling is provided between the shaft 6 and the cage 59 of the pendant assembly 58. This results in a predetermined lever arm being established between the shaft and the arm 85 of the cage engaging the piston body 80. The end resultant is that a predetermined turning movement is applied to said arm which is effective to gradually overcome the resistance of the damping and delay mechanism and cause an adjustment to the air spring.

However, assume that the relative movement between the vehicle members is such that the shaft 6 is rotated to carry either of said curved surfaces of the cam 56 over and past the pressure plate 66. When this occurs, one of the apex portions 70 of the cam, depending upon the direction of relative movement between the vehicle members, is carried into engagement with the underside surface of the top plate 64 of the cage, whereby the latter is raised upwardly relative to the axis of the shaft 6 and raises the arm 85 attached thereto upwardly within the bore 84 of the piston body 80. This latter movement is effective to decrease the length of the lever arm between the shaft and the arm 85, whereby substantially the same turning movement as is realized in the previous operational cycle is applied to the piston body.

Therefore, it is now realized that the resilient coupling is operative to determine the length of lever arm between the shaft and the cage in response to the magnitude of the sustained force or impact applied to the vehicle members. Additionally, it is seen that the resilient coupling is effective to vary the length of said lever arm such that the resultant turning movement applied to the piston body is substantially the same throughout an expanded range, whereby the delay period of the damping and delay mechanism is substantially constant over a greater range of applied forces or impacts than heretofore realized.

A typical operational cycle of the instant form of damped valve device will now be described for controlling a vehicle fluid suspension system utilizing an air spring for maintaining the vehicle body above its riding axles in what is known in the art as the "safe-riding" spaced relationship.

The housing 5 is usually, though not necessarily, attached to the vehicle body such that it normally rides in a position as shown in Fig. 1. The oscillatable shaft 6 is connected by the lever 7 through suitable linkage (not shown) to the riding axles. In addition, as mentioned previously, the air spring is connected by the conduit 25 to the housing and, in like manner, a source of pressure fluid is attached to said housing by means of fitting 35.

With the above structure and assuming that the vehicle is traveling over an irregular roadway, the impacts resulting therefrom are normally very short in duration and cause slight oscillations of the lever 7 and attached shaft 6 whereby the cam 56 mounted on the latter tends to force the pressure plate 66 downward against the resistance of the spring 65 and increase the coupling between the shaft and the cage 59 of the pendant assembly 58. The resultant reaction is that the pendant assembly tends to be swung about the shaft, however, the fluid medium in the pressure chamber 83 of each cylinder 76 and 77 exerting an oppositely directed force against the piston assembly 79, is effective to oppose and delay the movement of said pendant assembly. And, since said impacts are normally of relatively short duration, the turning movements resulting therefrom are not sustained over a functioning period sufficient to overcome the resistance of said delay and damping mechanism, and the vehicle members are retained in their normal "safe-riding" spaced relationship.

However, when a force or impact is applied to the vehicle whereby its body and axles move relatively toward each other over a prolonged period of time, such as occurs when the load carried by the body is increased, the lever 7 is pivoted in such manner as to cause the shaft 6 to rotate clockwise as viewed in Fig. 3. This latter movement causes the curved surface 69 of the cam to ride over the pressure plate 66, forcing the same downward in the cage 59 and compressing the spring 65, whereby the force of said spring is increased, which in turn, increases the coupling between the shaft and cage. The pendant assembly thereby tends to swing clockwise with the shaft, but is prevented from doing so by the resistance exerted by the damping and delay mechanism. And, after a predetermined period of time, assuming that the force or impact is sustained upon the vehicle members, the resistance of said mechanism is overcome in the manner previously described, permitting the pendant assembly to be swung clockwise, whereby the cage 59 actuates valve 39 to connect the source of pressure fluid to the air spring through its associated fluid circuit. In this manner, the air spring is inflated in proportion to the relative movement between the vehicle members, and said members are returned to their normal "safe-riding" spaced relationship. And, as said members are being returned to their normal relationship, the resultant relative movement therebetween is in the opposite direction and causes the shaft 6 to be rotated counterclockwise, whereby the coupling between the cage 59 and said shaft is increased and tends to swing the pendant assembly in the opposite or counterclockwise direction. This latter swinging movement is initially delayed by the fluid resistance exerted by the damping and delay mechanism acting in the opposite direction, and after a predetermined period said fluid resistance is overcome, as explained hereinabove, to permit the pendant assembly to swing counterclockwise with the shaft. The disk valve 43 of valve 39 is then seated upon its valve seat 45, shutting off the source of pressure fluid from the air spring. The turning movement resulting from the relative movement between the vehicle members due to the inflation of the air spring, in conjunction with the resilient coupling effected by the spring 65 are effective to return the pendant assembly 58 and piston assembly 79 to their normal nonoperative central position within the reservoir and cylinders 76 and 77, respectively, and to ready the damped valve device for a subsequent operative cycle. A spring, such as coil spring 87, which is shown in the modified form of Fig. 7, may also be disposed between the end of each valved head of the piston assembly and the adjacent closure member 82 to assist in the return movement of said piston assembly to its central nonoperative position.

And, it is realized that when the vehicle members move relatively away from each other, such as occurs when the load carried by the body is lessened, the shaft 6 is rotated in a direction opposite to that described whereby the air spring is deflated. Namely, after overcoming the resistance of the damping and delay mechanism, the cage 59 of the pendant assembly 58 will be swung counterclockwise, as viewed in Fig. 3, to depress the plunger 41 of valve 33 to actuate the latter and connect the air spring to atmosphere through its associated fluid circuit. Said air spring is thereby deflated in proportion to the relative movement between the vehicle members and the latter are returned to their normal "safe-riding" spaced relationship. And, additionally, upon the air spring being deflated, the relative movement between the vehicle members resulting therefrom is effective to return the actuated components of the damped valve device to their nonoperative position to await a subsequent force or impact upon the vehicle members.

In Figs. 5 and 6 is shown an alternate form of valve structure adapted to be carried in the housing 5 on opposite sides of the reservoir and actuated by the movement of the pendant assembly 58 for controlling the inflation and/or deflation of the air spring. More specifically, and with reference to Fig. 5, the housing 5 is provided with an enlarged bore 115, one end of which opens to the exterior of said housing and provided with suitable threads at 116 for the attachment of a suitable fitting 117 to which, in turn, is connected a source of pressure fluid. The opposite end of said bore is partially closed by a vertically extending wall 118 formed integrally with the housing and having an aperture 119 formed centrally therethrough and communicating with said reservoir and bore. A substantially cup-shaped valve base member 120 is disposed in said bore and formed with a cavity 121 on one end adjacent to the wall 118. A plurality of transverse radially extending ports 122 provided in said valve base member have one end in communication with the cavity 121, whereas, the opposite ends thereof connect with an annular recess 123 provided in the outside surface of said base member. The end of said base member, opposite to the cavity 121, is also provided with an outwardly axially extending valve seat 124, which surrounds one end of a port 125 extending longitudinally centrally through said base member and which connects with the cavity 121. The annular recess 123 communicates with the fluid channel 38, described in the previous embodiment, whereby pressure fluid, flowing through the fitting 117 and port 125 and into the cavity 121, may then flow through the radial ports 122 and into said recess and thence through the channel 38 to the air spring to inflate the latter. A disk valve 126 is adapted to seat upon said valve seat 124 to control the flow of pressure fluid through the port 125 and is mounted on one end of an elongated plunger 127 which extends through said port 125 in radially inwardly spaced relationship and which is provided on its opposite end with an enlarged head 128 adapted to protrude through the aperture 119 in the wall 118 and into the reservoir 11 adjacent the cage 59 of the pendant assembly. A spring 129 disposed in a counterbore 130 formed on the inner end of the fitting 117 engages the disk valve 126 and is effective to normally bias the same upon its valve seat 124 thereby disconnecting the port 125 from the source of pressure fluid. Said inner end of the fitting 117 and the adjoining end of the valve base 120 may extend radially inwardly toward the center of the bore 115 defining an annular groove 131 substantially V-shaped in cross section, which receives a suitable and similarly shaped sealing gasket 132 adapted to prevent transgression of pressure between the valve base and the wall of the bore. And, a suitable resilient sealing gasket 133 may be disposed in the bore 115 between the wall 118 and the adjacent end of the valve base 120, being provided centrally with an aperture 134 through which the plunger 127 of the valve extends in close fitting relationship, and is adapted to prevent the transgression of pressure fluid between the bore and reservoir and in addition, the inherent resiliency of said gasket is effective to assist the spring 128 in returning the disk valve 126 to its valve seat 124. Said sealing gasket therefore provides a highly efficient positive seal and at the same time overcomes the frictional resistance to the movement of the valve plunger that is encountered in the foregoing embodiment wherein the O-ring 41a is utilized.

The alternate form of valve structure shown in Fig. 6 for controlling the deflation of the air spring comprises an enlarged bore 135 adapted to be formed in the housing 5 on the opposite side of the reservoir 11 to that of the bore 115 for the valve structure of Fig. 5. The valve base member 136 and valve member 137 per se, in the instant form, are similar to that utilized in the latter mentioned valve structure. However, a closure member 138 is threadably secured in the open end of the bore 135 and is effective to seal the same from atmosphere. A stepped counterbore 139 formed in the inner end of the closure member 138, extends partially longitudinally therethrough and communicates with one end of a port 140 of the valve base member 136. A plurality of transverse, radially extending ports 141 formed in said closure member adjacent the inner end thereof have one end in communication with the counterbore 139, and the opposite ends thereof open into an annular recess 142 formed on the outside surface of said closure member. Said annular recess is adapted to connect with the channel 27 provided in the housing and described previously in the embodiment of Figs. 1–4 inclusive and which in turn, connects the fluid channel 26 connected to the air spring to the counterbore 139. A plurality of radially extending ports 143 provided in the valve base member 136 and communicating with the cavity 144 formed centrally therein and the annular recess 145 provided on its outside surface are effective to connect the opposite end of the port 140 in said valve base member through the channel 32, hereinabove described, to atmosphere. The disk valve 146 normally seated on its valve seat 146a, provided on the end of the valve base member 136 adjacent to the closure member 138 is effective to seal the port 140 and hence the air spring from atmosphere. A plunger 147 of the valve member 137, extending longitudinally through the port 140 in a radially inwardly spaced relationship, has one end secured to the disk valve 146 and its opposite end provided with an enlarged head 148 which is adapted to protrude through the aperture 149 provided centrally in the inner wall 150 of the bore and into the reservoir 11. Said plunger is thereby in a position to be actuated by the movement of the cage 59 of the pendant assembly in response to an oppositely directed relative movement between the vehicle members to raise the disk valve 146 off its respective seat 146a and connect the air spring to atmosphere. The resilient sealing member 151 disposed in the bore and surrounding the plunger 147 of said valve member 137 in close fitting relationship is similar in construction and function to that of gasket 133 in Fig. 5, and is also effective to assist a spring 152, interposed between the disk valve 146 and the closure member 138, in returning said disk valve to its valve seat.

In Fig. 7 is shown an alternate form of piston assembly for the damping and delay mechanism of the present invention, and in the description to follow, components of the damped valve device in the instant form that are similar to those utilized in the embodiments of Figs. 1–4 are denoted by the same reference characters. Said alternate piston assembly comprises a pair of separate cylindrical pistons 156 and 157, each similar to the other in construction and slidably disposed in opposed relationship in cylinders 76 and 77, respectively, in the housing 5. Each of said pistons is provided with a valved head 81 similar in construction and function to that of the valved heads utilized in the piston assembly 79 in the previous embodiment and therefore need not be further described. A spring 87 is disposed in the pressure chamber 83 of each cylinder 76 and 77 and interposed between the closure member 82 and the valved head 81 of the piston disposed therein and is effective to normally bias said pistons to a central position in the housing as is shown in Fig. 7. The inner end of each of said pistons extends into the lower portion of the reservoir 11 and is provided centrally with an inwardly facing and transversely extending U-shaped slot 160 which is adapted to embrace the enlarged head 85a on the end of the actuating arm 85 on diametrically opposed sides thereof. A stepped aperture 161 is provided in the bottom wall of the housing 5, opening into the central portion of the reservoir 11, and into which a stop plug 162 is adapted to be pressed. Said plug is provided with a cylindrical body 163 which extends upwardly within the reservoir and is disposed in and embraced by the U-shaped slots 160 on the opposed inner ends of the pistons 156 and 157. The springs 87 act to normally bias said pistons against the cylindrical body 163 of said stop plug. A suitable closure member 164 is placed within the outer portion of the stepped aperture 161 to effectively seal the latter. Also, as is shown in Fig. 7, the depth of said slots 160 is such as to space the inner end of each of the pistons slightly apart, thereby preventing either piston from bottoming against the other.

It will now be realized that upon a relative movement between the vehicle members of prolonged duration, the resistance exerted by the fluid medium of the damping and delay mechanism will be gradually overcome, as hereinabove explained. The pendant assembly 58 will then be swung with the shaft 6 to force one of the pistons 156 or 157 into its respective cylinder, depending upon the direction of said relative movement, whereby the fluid medium contained in the pressure chamber of the actuated cylinder will be metered therefrom and returned to the reservoir 11. And, during said pendant assembly movement, the non-actuated piston will remain stationary, since it engages the cylindrical body 163 of the plug 162, and the arm 85 in the pendant assembly will be carried away from its slotted inner end. Upon actuation of one or the other of the valves 33 or 39, depending upon the direction of relative movement between the vehicle members, the air spring will be adjusted accordingly and will in turn cause a relative movement between said vehicle members in the opposite direction, which is effective to tend to swing the pendant assembly in the opposite direction, and, since the nonactuated piston has not moved, the pendant assembly is free to be swung in said opposite direction with the shaft. Also, the actuated piston readily follows the return movement of the pendant assembly under the influence of its spring 87 to rapidly return said piston to its central inoperative position within the housing. As said actuated piston moves under the influence of its spring, the force exerted by the fluid medium in the pressure chamber associated with said latter piston is decreased, creating a differential in force between the fluid medium contained in the latter and in the reservoir 11, which is effective to cause the actuation of the replenishing valve 96 of said latter piston and allow fluid medium to flow from the reservoir and into said pressure chamber to replenish the same. The return movement of the shaft and pendant assembly is continued until the vehicle members are returned to their aforesaid normal spaced relationship, at which time the pendant assembly and actuated piston are again reset centrally within the housing, as shown in Fig. 7, to ready the device for a subsequent operative cycle.

It is therefore realized that in the instant form of damping and delay mechanism wherein two separate pistons are used, the relative movement between the vehicle members resulting from an adjustment to the air spring is effective to rapidly return the pendant assembly to its central nonoperative position, since its movement is not resisted by the aforesaid damping and delay mechanism.

Additionally, it is realized that the rapid return of the shaft and pendant assembly to their nonoperative central position permits the actuated valve member to quickly close, thereby disconnecting the air spring from the source of pressure fluid or atmosphere, depending upon the direction of relative movement between the vehicle members and thus prevents an over-adjustment to the air spring.

It is also realized that the present form of piston assembly, wherein each of the aforesaid pistons are free of any rigid interconnection, is very sensitive to the movements of the pendant assembly which prevents any tendency of said pistons to drift during their stroke, which may result in an over-adjustment to the air spring. Additionally, as in the previous embodiment, by replenishing the fluid medium directly through the pistons and into the pressure chambers, a more positive and direct acting device is provided which has a compact structure and a minimum of moving parts.

In Figs. 8-10 inclusive is shown an elongated torsion bar 165, hereinafter referred to as a "sway bar" adapted to be mounted between the vehicle members and linkably connected at its center to the shaft of one or several damped valve devices and which is operative in response only to predetermined types of relative movement between said vehicle members to cause actuation of said devices. This structure is preferably applicable for controlling one or more air springs separately interposed between the vehicle members and wherein lateral leveling of said vehicle members is desired to be prevented. More specifically, the sway bar 165 is shown to be substantially U-shaped in configuration, and comprising a straight central portion 166 integrally provided on each end with an arm 167 which inclines outwardly therefrom. The central portion 166 is journalled to the frame 168 of the vehicle body at longitudinally spaced points by means of suitable bushings 169 such that the arms 167 extend outwardly substantially an equal distance on either side thereof. Each of the arms is attached at its free end to the wheel supporting structure 170 by means of suitable fasteners 171.

The damped valve device and/or devices V, which may be any one of the forms disclosed herein, is preferably mounted on the cross bar 172 of the body frame 168 such that its shaft 6 preferably extends transversely to and crosses the longitudinal center line of the said frame. The shaft 6 is connected to the center of the central portion 166 of the sway bar 165 by linkage 173 comprising lever arm 174 connected at its one end to the center of said central portion and at its opposite end to connector link 175. The opposite end of said link is connected to an actuating lever 176 mounted on the shaft 6. Said linkage is preferably in alignment with the aforesaid center line of the frame.

With the above described construction, it is now realized that if a relative movement between the vehicle members is such as to cause the vehicle wheels W to move in opposite directions, that is, one up and the other down relative to the body frame, such as is caused when the vehicle is turned, the sway bar will revolve in opposite directions in each of the bushings 169. And, because of this torsional movement of said bar, there will be substantially no movement of the center of the latter relative to the body frame and the damped valve device will not be actuated.

However, if the relative movement between the vehicle members causes both wheels to move in the same direction, or one wheel to remain stationary while the opposite wheel moves relative to the body frame, or is effective to cause unequal movement of the wheels in opposite directions, then the center of the sway bar will be revolved accordingly and will actuate the damped valve device to effect an adjustment to the air springs. In the case of unequal movement of the wheels in opposite directions, the movement of the center of the sway bar will be equal to the difference in the deflection of the wheels from their normal position relative to the frame of the vehicle.

In Fig. 11 is shown another form of sway bar which is applicable for controlling the actuation of one or more of the damped valve devices of the present invention whereby the said devices need not necessarily be mounted at the center of the body frame of the vehicle. More specifically, the sway bar in the present form comprises an elongated torsion bar 180 similar in construction and attached to the vehicle members in a manner similar to that of the form shown in Figs. 8-10. The central portion of said bar is disposed in an elongated tube 181, the latter comprising a pair of tubular members 182 laid in end to end relationship and having flange 183 provided integrally on each abutting end, which are secured to each other by any suitable fasteners 184. The flanged end of each tubular member 182 extends radially inwardly to engage the surface of the torsion bar 180 to provide suitable bearing therefor. A threaded U-shaped slot 182a formed axially through the adjoining faces of each flange 183 are placed in alignment and provide means to threadably secure a suitable set screw 183a therein which is adapted to engage the surface of the torsion bar 180 at its longitudinal center. An arm 184a is rigidly attached to either end of said tube, extending perpendicularly relative thereto and is adapted to be operatively connected to an actuating shaft of a damped valve device by suitable linkage such as utilized in the form shown in Figs. 8-10.

With this construction, the damped valve device or devices need not be mounted on the center line of the vehicle body and the movement of the tube 181 is caused only by a movement of the center of the torsion bar 180, since the only interconnection between the latter and said tube is through the set screw 183a. Also, the center of the sway bar 180 in the present instance is moved only in response to a relative movement between the vehicle members similar to that described in the previous form. This construction is particularly applicable on vehicles wherein space is at a premium and the damped valve device or devices cannot be readily mounted on the longitudinal center line of the body frame.

In Figs. 12–17 inclusive, is shown an alternate form of damped valve device embodying the concepts of the present invention, and in which a plurality of valves are selectively actuated in response to a relative movement of prolonged duration between the vehicle members to cause a substantially simultaneous adjustment to a pair of separate air springs of a fluid suspension system connected in fluid circuit thereto.

More specifically, the housing 185 in the present form is shown to be somewhat similar in configuration to that of the previous form, and is also provided centrally with a vertically elongated fluid containing reservoir 186 and a pair of horizontally extending cylinders 187 and 188 disposed on either side of said reservoir and communicating with its lower portion. Suitable closure members 189 are effective to seal the outer ends of said cylinders. An oscillatable shaft 191 is journalled in the housing and has its one end protruding through a boss 192 in the upper portion of the latter and is adapted to be attached to one end of a lever arm 193. The opposite end of said lever arm may be connected by suitable linkage to the riding axles of the vehicle, whereas the housing may be mounted upon the vehicle body structure in a vertical position such as is shown in Fig. 12.

The opposite end of the shaft 191 mounts a cam 194, which in turn, is resiliently coupled to a pendant assembly 195 mounted thereon. Said cam and pendant assembly are substantially similar to the previous form; however, in the instant structure the cam is mounted on the shaft such that its curved segment 196 normally engages the pressure plate 197 of the pendant assembly while the flat surface 198 thereof engages the top wall 199 of the cage 200. With this particular disposition of the cam, the opposed flat segments 201 and 202 thereof are normally inclined downwardly and inwardly and connect at their lower ends to either side of said curved segment 196 and at their upper end to oppositely disposed curved surfaces 203 and 204.

It is seen therefore, that when the shaft 191 is oscillated in response to a relative movement between the vehicle members, the cam 194 is rotated also, and depending upon the direction of said relative movement, one of the curved surfaces 203 or 204 is carried into engagement with the top wall 199 of the cage and one of the flat segments 201 or 202 is brought to bear upon the pressure plate 197.

This movement is such as to simultaneously cause a spring 205 to be compressed to increase the coupling between the pendant assembly and the shaft and also to effect a movement of the pendant assembly 195 upward relative to the shaft 191. Therefore, in the instant embodiment, the lever arm between the shaft and the piston assembly is lessened at the same time the aforesaid coupling is increased and this combined reaction is proportioned to the relative movement between the vehicle members. The pendant assembly is thereby swung with the shaft.

The instant form of valve device is also provided with a damping and delay mechanism adapted to resist the swinging movement of the pendant assembly. Said mechanism includes a double headed piston assembly slidably disposed in the cylinders 187 and 188 and extending across the reservoir 186 in a manner similar to that previously described and defining a pressure chamber 207 in each of said cylinders between the valved head on each end of the piston assembly and the adjacent closure member 189. The piston body 80, per se, is substantially similar in construction to that utilized in the embodiment of Figs. 1–4, and therefore, a further detailed description will not be given. However, in the present form equivalent components will be referred to by corresponding reference characters. With reference to Fig. 13, suitable coil springs 208 are shown to normally position the piston body 80 centrally in the housing 185.

Each of the pressure chambers 207 is connected in fluid circuit with the reservoir 186 by means including a port 209 formed in the housing on either side of said reservoir and which has its one end in communication with its associated pressure chamber 207 adjacent to the closure member 189. The opposite end of each of said ports communicates with a metering port 210, Fig. 14 which in turn has its one end opening into the reservoir. The opposite end of each of said metering ports is provided with suitable threads at 211 adapted to threadably secure therein a metering valve 212 which is selectively positioned to regulate the flow of fluid medium passing therethrough.

The pendant assembly is also operatively connected to the piston assembly by a rod-like arm or finger 213 integrally provided on the base of the cage 200 which is adapted to slidably interfit the central bore 84 of the piston body 80.

With this construction it is seen that the damping and delay mechanism is operative in a manner similar to that of said previous form to delay the swinging of the pendant assembly and is effective to prevent the actuation of the valves, now to be described, for controlling a pair of separate air springs until a sustained relative movement between the vehicle members is realized.

As previously mentioned, the valves in the present form of device provide for the simultaneous adjustment of a pair of separate air springs of a vehicle suspension system connected in fluid circuit therewith. For this purpose the housing is provided with a pair of fluid channels 215 and 216, Fig. 17, extending horizontally longitudinally therethrough and spaced vertically therein one above the other in substantial parallel spaced relationship. One end of each of said channels opens to the exterior of said housing into which is suitably secured one end of a conduit 217 and 217a, respectively; the opposite ends of which may connect to one of each of said air springs. It is also contemplated that several or more air springs may be connected in parallel with respect to each other to form a group of air springs and then this group may be connected in fluid circuit with one of the conduits 217 or 217a. In this manner a pair of groups of air springs may be controlled by the instant device.

A port 219 formed in said housing substantially perpendicular to channel 215 has its one end in communication with the latter adjacent its closed end and extends transversely through said housing wherein its opposite end communicates with a dead-end cylindrical bore 220. Said bore extends longitudinally through the housing on one side of the reservoir 186 and substantially perpendicular to the axis through which the pendant assembly swings. In like manner, a port 221 formed in the housing on the opposite side of the reservoir has its one end in communication with the end of the aforesaid channel 215 and extends substantially transversely through said housing wherein its opposite end connects with a bore 223 similarly formed to that previously described but disposed in said housing on the opposite side of the reservoir and substantially in longitudinal alignment with said latter bore.

The fluid channel 216, Fig. 15, is also provided adjacent its ends with ports 225 and 226, the former of which extends transversely through the housing and communicates with a cylindrical bore 227 formed in the latter adjacent the bore 220 and in parallel spaced relationship thereto. And, in like manner, the port 226 connects with a bore 228 similarly disposed in the housing adjacent the bore 223 on the opposite side of the reservoir 186, and which is also in substantial longitudinal alignment with the aforesaid bore 227. A hole 229 centrally provided in the base wall of each of said bores communicates with the reservoir 186, the purpose for which will be presently explained.

In each of the aforesaid bores is mounted a normally closed valve member 230 substantially similar in construction and consisting of a cylindrical sleeve fitting 231 provided centrally with a valve bore 232 having a configuration substantially similar to the bore in the usual pneumatic tire valve stem, and into which a valve core or insides 234 is secured as will be well understood in the art. The bore 232 is so shaped that the valve core or insides is placed into the same from the inner end of the fitting such that its valve pin 235 extends through the aforesaid hole 229 and into the reservoir adjacent the cage 200 of the pendant assembly. As shown in Fig. 15, the sleeve fitting 231 in bore 227 is integrally provided on its outer end with a suitable fitting 237 provided internally with a port communicating with the bore 232 of said sleeve fitting and to which is adapted to be attached a suitable source of pressure fluid, preferably pressurized air. The remaining sleeve fittings are each integrally provided with a threaded cap 238 which screws into the outer end of its respective bore and is effective to seal the latter from atmosphere.

Each of said sleeve fittings is also provided with a port 240 extending radially through its wall and connecting the bore 232 at a point ahead of the valve core or insides to an annular groove or recess 241 formed on the periphery of the fitting. In like manner, a port 242 extending radially through the opposite end of each of said fittings connects its valve bore at a point to the rear of its valve core or insides to a similarly shaped groove or recess 243 also formed on the fitting periphery. The bores 220 and 227 are additionally interconnected by a port 245 which also communicataes with the annular groove or recess 241 in each sleeve fitting carried therein. In like manner, a port 246 interconnects the bores 223 and 228, communicating with the annular groove or recess 243 in each sleeve fitting carried in said latter bores and which opens to the exterior of the housing connecting the same to atmosphere.

Additionally, the previously mentioned port 219 communicating with one end of the fluid channel 215 connects with the annular recess 243 of the sleeve fitting in the bore 220, whereas, the port 221 communicating with the opposite end of the channel 215 connects with the annular recess 241 of the sleeve fitting in the bore 223. And, in like manner, the port 225 communicating with one end of the fluid channel 216 connects with the annular recess 243 of the sleeve fitting in the bore 227, whereas the port 226 communicating with the opposite end of said channel connects with the annular recess 241 of the sleeve fitting in the bore 228.

With this construction and assuming that an impact applied to the vehicle members causes them to move relatively toward each other over a prolonged period of time such as occurs when the load carried by the body is increased, the shaft 191 will be rotated in such manner as to tend to swing the pendant assembly 195 in an upward direction as viewed in Fig. 15, which movement is prevented by the fluid resistance exerted by the damping and delay mechanism in a manner similar to that described above, thereby increasing the coupling between the shaft and pendant assembly and effecting a movement of the pendant assembly relative to the shaft to decrease the lever arm between the latter and the piston assembly. And, after a predetermined period of time, said resistance is overcome, permitting the pendant assembly to swing whereby the cage 200 is effective to actuate the valves in the bores 220 and 227. The source of pressure fluid connected to fitting 237 is thereby connected to the air spring or air springs in circuit with conduit 217a through the actuated valve in bore 227, its bore 232 and port 242 and annular recess 243 and thence through port 225 to channel 216. And, at the same time, said pressure fluid is connected to the air spring or air springs in circuit with conduit 217 through the actuated valve in bore 220, its bore 232 and port 242 and annular recess 243, and through port 219 to the channel 215. The air springs are thereby substantially simultaneously inflated in proportion to the relative movement between the vehicle members and are effective to return said members to their normal "safe-riding" spaced relationship. And, after overcoming the resistance of the damping and delay mechanism acting in the opposite direction as above described, said latter movement between the vehicle members is effective to return the pendant assembly to its central nonoperative position within the reservoir 186 whereby the actuated valves are then permitted to close, shutting off said air springs from the aforesaid source of pressurized air.

It is now realized that if the vehicle members move relatively away from each other such as caused by decreasing the load carried by the body, the shaft 191 will be rotated to swing the pendant assembly in the opposite direction to that just described, and after overcoming the resistance of the damping and delay mechanism, the pendant assembly will be swung sufficiently to actuate the valves in bores 223 and 228. The air spring or air springs in circuit with conduit 217 will then be connected to atmosphere through channel 215, port 221, bore 223, and past the actuated valve in said latter bore to the port 246. And, in a similar manner, the air spring or air springs in circuit with conduit 217a will then be connected to atmosphere through channel 216, port 226, bore 228, and past the actuated valve in said bore to port 246. The air springs are thereby deflated in proportion to the relative movement between the vehicle members and result in lowering said members to their normal "safe-riding" spaced relationship. And, after overcoming the resistance of the damping and delay mechanism acting in an opposite direction, said latter movement is effective to return the pendant assembly to its central nonoperative position within the reservoir, thereby permitting the actuated valves to close and disconnect said air springs from atmosphere.

It is therefore realized in each of the above described operational cycles, that the relative movement between the vehicle members resulting from an adjustment made to the air springs is effective to return the actuated components of the damped valve device to a nonoperative position and to condition the same for a subsequent sustained impact or force applied to the vehicle members.

Having thus described in detail several preferred embodiments, it is realized that the damped valve device of the present invention is susceptible of various combinations and modifications without departing from the scope of the appended claims.

Having thus described my invention I claim:

1. A damped valve device for a fluid pressure unit that effects the relative movement between two movable members, comprising a housing to be attached to one of said movable members and having a reservoir containing a pressure fluid, a shaft journalled in said housing to be operatively connected to the other of said movable members, a pair of spaced valve means in said housing operable to selectively connect a fluid pressure unit to a source of pressure fluid or to atmosphere, pendant means operatively connected to said shaft and movable therewith to effect the actuation of said valve means comprising a cage surrounding said shaft and extending through the space between said valve means into said reservoir, said cage including a pair of ends spaced along a line passing through the space between the valve means, cam means on said shaft engaging one of said cage ends, coupling means carried in said cage including a resilient member positioned between the cam means and the other of said cage ends to engage said other cage end for interconnecting the cage to said cam means, said cam means being movable with the shaft in response to a relative movement between the movable members to compress said resilient member and cause a movement to said cage to effect the actuation of said valve means, and fluid damping and delay means in said reservoir and operatively connected to said cage to resist the movement thereof and delay the actuation of said valve means, said cage establishing a lever arm between the shaft and the damping means, said resilient member being compressible in a direction substantially transverse to the direction of spacing of said valve means, said cam means being movable with said shaft in response to continued relative movement between said movable members to move the cage substantially along said line transversely of the shaft to effectively shorten the lever arm between the shaft and the damping means.

2. A damped valve device for a fluid pressure unit that effects the relative movement between two movable members, comprising a housing to be attached to one of said movable members and having a reservoir containing a pressure fluid, a shaft journalled in said housing to be operatively connected to the other of said movable members, a pair of spaced valve means in said housing including valve stems displaceable along parallel axes to selectively connect a fluid pressure unit to a source of pressure fluid or to atmosphere, pendant means operatively connected to said shaft and movable therewith to effect displacement of said valve stems comprising a cage surrounding said shaft and extending through the space between said valve means into said reservoir, said cage including a pair of ends spaced along a line passing through the space between the valve means, cam means on said shaft engaging one of said cage ends, coupling means carried in said cage including a resilient member positioned between the cam means and the other of said cage ends to engage said other cage end for interconnecting the cage to said cam means, said cam means being movable with the shaft in response to a relative movement between the movable members to compress said resilient member and cause a movement to said cage to effect the displacement of said valve stems, and fluid damping and delay means in said reservoir displaceable along an axis parallel to the axes of displacement of the valve stems, said damping means being operatively connected to said cage to resist the movement thereof and delay the displacement of said valve stems, said cage establishing a lever arm between the shaft and the damping means, said resilient member being compressible in a direction substantially transverse to the direction of spacing of said valve means, said cam means being movable with said shaft in response to continued relative movement between said movable members to move the cage substantially along said line transversely of the shaft to effectively shorten the lever arm between the shaft and the damping means.

3. A damped valve device for a fluid pressure unit that effects the relative movement between two movable members, comprising a housing to be attached to one of said movable members and having a reservoir containing a pressure fluid, a shaft horizontally journalled in said housing to be operatively connected to the other of said movable members, a pair of horizontally spaced valve means in said housing operable to selectively connect a fluid pressure unit to a source of pressure fluid or to atmosphere, pendant means operatively connected to said shaft and movable therewith to effect the actuation of said valve means comprising a cage surrounding said shaft and extending substantially vertically through the space between said valve means into said reservoir, said cage including a pair of vertically spaced ends, cam means on said shaft engaging one of said cage ends, coupling means carried in said cage including a substantially vertically extending resilient member positioned between the cam means and the other of said cage ends to engage said other cage end for interconnecting the cage to said cam means, said cam means being movable with the shaft in response to a relative movement between the movable members to compress said resilient member and cause a movement to said cage to effect the actuation of said valve means, and horizontally displaceable fluid damping and delay means in said reservoir operatively connected to said cage to resist the movement thereof and delay the actuation of said valve means, said cam means being movable with said shaft in response to continued relative movement between said movable members to move the cage substantially vertically relative to the shaft to effectively shorten the lever arm between the shaft and the damping means.

References Cited in the file of this patent

UNITED STATES PATENTS

| | | |
|---|---|---|
| 1,512,805 | Roucka | Oct. 21, 1924 |
| 1,672,223 | Larsen | June 5, 1928 |
| 1,890,494 | Borden | Dec. 13, 1932 |
| 2,583,250 | Ball | Jan. 22, 1952 |
| 2,670,201 | Rossman | Feb. 23, 1954 |
| 2,687,311 | Nallinger | Aug. 24, 1954 |
| 2,757,376 | Brueder | July 31, 1956 |
| 2,788,982 | Allison | Apr. 16, 1957 |
| 2,843,396 | Lucien | July 15, 1958 |
| 2,888,270 | Wolfram | May 26, 1959 |

OTHER REFERENCES

Germany, H17,488 11/63C, Mar. 1, 1956.